United States Patent [19]

Smith

[11] 4,240,122

[45] Dec. 16, 1980

[54] PROTECTIVE DEVICE

[75] Inventor: John E. Smith, Cambridge, Ohio

[73] Assignee: McGraw-Edison Company, Rolling Meadows, Ill.

[21] Appl. No.: 23,960

[22] Filed: Mar. 26, 1979

[51] Int. Cl.³ .................... H02H 7/04; H01H 85/02

[52] U.S. Cl. .................... 361/41; 337/202

[58] Field of Search .................... 361/41, 38; 337/9, 10, 337/187, 196, 204, 202

[56] References Cited

U.S. PATENT DOCUMENTS

| | | | |
|---|---|---|---|
| 2,161,427 | 6/1939 | Papp | 200/129 |
| 2,866,032 | 12/1958 | McCloud | 361/41 X |
| 2,918,557 | 12/1959 | Link | 200/129 |
| 3,178,613 | 4/1965 | Dornbush et al. | 361/41 |
| 3,292,048 | 12/1966 | Swoish et al. | 361/41 |
| 3,366,761 | 1/1968 | Smith | 200/114 |
| 3,519,970 | 7/1970 | Lusk et al. | 337/9 |
| 3,628,092 | 12/1971 | Keto | 361/41 |
| 3,699,490 | 10/1972 | Macemon | 337/202 |
| 3,748,621 | 7/1973 | Sakats | 337/173 |
| 3,829,810 | 8/1974 | Giegrich | 337/202 |
| 3,916,259 | 10/1975 | Russell et al. | 361/41 |
| 3,916,260 | 10/1975 | Westrom et al. | 361/41 |
| 3,916,364 | 10/1975 | Cooper | 337/217 |

FOREIGN PATENT DOCUMENTS

| | | | |
|---|---|---|---|
| 970809 | 7/1975 | Canada | 337/196 |
| 196369 | of 1923 | United Kingdom | 361/41 |
| 829312 | 3/1960 | United Kingdom | 361/41 |

*Primary Examiner*—J. D. Miller
*Assistant Examiner*—L. C. Schroeder
*Attorney, Agent, or Firm*—Jon Carl Gealow; Ronald J. LaPorte

[57] ABSTRACT

A protective device for electrical power distribution equipment includes a removable fuse holder and an integral load switch. The protective device may be affixed to a grounded metal enclosure, such as an oil-filled transformer, into which the protective device extends. The fuse holder may be removed from the protective device for checking or replacement with a minimal opening into the enclosure into which the protective device extends. A suitable load switch actuator is provided for controlling current flow through a fuse in the fuse holder. This load switch actuator also provides an interlock arrangement to prevent removal of the fuse holder from, as well as insertion of the fuse holder into, the protective device unless the load switch is open, thus ensuring that interruption and initation of current flow through the fuse in the removable fuse holder is controlled by the load switch.

8 Claims, 7 Drawing Figures

PROTECTIVE DEVICE

BACKGROUND OF THE INVENTION

1. Field of the Invention

This invention relates generally to protective devices which contain fuses and load switches used in conjunction with power distribution equipment, such as those mounted in metal-clad enclosures, and more particularly, this invention relates to protective devices with removable fuse holders for use in oil-filled power distribution transformers.

2. Description of the Prior Art

To prevent undesirable heating and potentially damaging and dangerous overload conditions, protective devices, which will interrupt the current flow in a circuit, may be inserted in series with a load. Both fuses and circuit breakers are such protective devices. Interrupting characteristics (time to interrupt current flow at various current and temperature levels) differ among protective devices, as does their ability to interrupt current flow. Because of these differences, multiple protective devices may be used together to give the desired interrupting characteristics.

Once current flow is established in a circuit, an inductive effect tends to promote the continuation of current flow. This inductive effect often causes arcing when the circuit is interrupted by separating conductive components. Arcing with the associated high temperatures is generally undesirable for a number of reasons, including potentially damaging combustion and conductive element erosion. The heating associated with high-temperature arcs can be reduced by immersing portions of the circuit where arcing is likely to occur in a liquid insulating medium. Commonly, equipment filled with such an insulating liquid is referred to as "oil-filled equipment".

Oil filling of transformers, which also reduces their operating temperature, is frequent in power distribution systems. Power distribution systems tend to operate at relatively high voltages in order to reduce conductor expenses. Because of such high voltages, current is more likely to flow along undesired paths. Therefore, since various components in a power distribution system must occasionally be moved when high voltages are present, operator safety mandates that the movements be effected with insulated tools, commonly called "hot sticks".

When fuses blow, relatively large reactive forces are often generated. These forces require that fuses be mechanically secured to their holders and that the holders be secured to a support to prevent violent movement. In the event they are not so secured, the fuse, or both the fuse and the fuse holder, may be forcibly propelled, presenting a hazard to equipment and operators. Fuses and their associated receptacles are not generally designed to function as a switch, when the fuse is mechanically withdrawn from the circuit. Should such a withdrawal occur when the circuit is conducting, the fuse may blow. Even when fuse blowing does not occur on withdrawal, damage can be caused to equipment from arcing. Should a conducting circuit be interrupted by withdrawal of a fuse by an operator, the operator is exposed to some risk because of his proximity to components at high-voltage levels. When a fuse is inserted into a high-voltage circuit and completes the conductive path, similar adverse effects exist. It is therefore desirable to provide a means independent of a fuse to complete and interrupt the circuit in which the fuse is located, such as by using a circuit breaker or switch in series with the fuse. It is also desirable, in those instances where the fuse is located in a grounded metal enclosure, to have the fuse easily removable from the interior of the grounded metal enclosure without opening the enclosure.

The protection afforded to the operator by using a circuit breaker or switch with the fuse is diminished if it is possible for an operator to withdraw the fuse without first interrupting current flow therethrough. To prevent such a possibility, some arrangements use load-break connectors which must be removed from an enclosure containing the fuse before safe access to the fuse may be achieved. Load-break connectors are socket and pin arrangements, which an operator disengages. In common with normal load switches, a load break connector speed of interruption, and therefore arc duration, is determined by the speed of actuation by the operator. Since most components and equipment are damaged by an arc of any duration, it is desirable to ensure that any arc drawn is of short duration and that any such arc is drawn between components which are resistant to arc erosion. To ensure short arc duration which is independent of the speed of actuation by the operator, quick-break switches are often used. Such quick-break switches have components which are resistant to arc erosion.

There are prior art devices having a removable fuse holder which cannot function to mechanically interrupt a circuit while it is being withdrawn from its enclosure. These devices require the removal of load-break connectors, or the rotation of fuse carrier contacts, before withdrawal can commence. Their lack of load-break switches, particularly of the quick-break type, is a disadvantage. Other devices include switches in conjunction with fuse holders, removable from the outside of an enclosure or otherwise, but fail to ensure that the switch opens the circuit before removal can be attempted. Such a device for use with a power distribution transformer of the oil-filled type, and which incorporates a quick-break switch, is disclosed in U.S. Pat. No. 3,292,048—Swoish et al., issued on Dec. 13, 1966 for a "Protected Electrical Transformer" and assigned to the same assignee as the present invention.

SUMMARY OF THE INVENTION

With the present invention, a protective device with a removable fuse holder and an associated load switch is provided. Expulsion of the removable fuse holder from the protective device, and from the enclosure in which it is mounted, is precluded by an interlock, which prevents removal of the fuse holder unless the load switch is open. This interlock also precludes insertion of the fuse holder if the load switch is not open. This interlock feature also precludes movement of the removable fuse holder to mechanically interrupt current flow. Further, the removable fuse holder may be removed from the protective device with only a minimal opening into the enclosure in which it is mounted. When the preferred embodiment of the protective device is mounted in an oil-filled transformer, and the fuses contained in the fuse holder are immersed in oil, there is no draining of the oil when the fuse holder is removed. Movable components of the protective device are adapted for maneuvering by hot sticks, such as the so-called "shotgun" type of hot stick.

The removable fuse holder is mounted on an angular support, which also supports other components and which provides the point of attachment to an enclosure on which the protective device is mounted. Also mounted on this support is a load switch to mechanically open and close the circuit through which current flows to a fuse of the protective device. The load switch position is controlled by a load switch actuator, which has a handle that provides an interlock to prevent the removable fuse holder from functioning as a switch to mechanically open or close the circuit.

The removable fuse holder has a sub-assembly of a base, movable contacts with fuse-mounting extensions and a cylindrical plate or cap. The preferred embodiment of the invention is adapted to contain oil-immersed double vent fuses of the expulsion type. A compressive gasket is located about an opening in the angular support that is enclosed by the circular plate when the fuse holder is fully inserted into the enclosure through the opening. The base is formed from insulating material and is flat and thin with a rectangular cross section. This base functions to support associated sub-components and, in cooperation with the remaining structure, ensures that the fuse is located in an appropriate location. The fuse mounting extensions are mounted on, such as by being integrally formed with, movable contacts, which are mounted on the base in appropriate locations to support a particular fuse and to provide a conductive path from each fuse end. These movable contacts and fuse-mounting extensions are located on the base near its end extending into the enclosure to which the protective device is affixed. From the fuse-mounting extensions, a conductive path continues to stationary contacts on the support through the movable contacts, which engage the stationary contacts when the fuse holder is fully inserted into the enclosure. The cap or circular plate is mounted transversely to the base near its exterior end and is adapted to close the opening in the support through which the fuse holder passes. Preferably, the circular plate includes a projecting looped handle for use with a hot stick.

The support of the protective device is also a subassembly, the principal purposes of which include insulating portions of the protective device which may be at different voltages, providing support for and connections between the other components, and providing a point of attachment between the protective device and the enclosure to which it may be affixed. The support includes a mounting bracket which is of a structural channel shape, with upper sides of the channel being bent outwardly and parallel to the channel floor. On each outwardly bent upper channel side, a guide is mounted. Each one of this pair of guides is manufactured from insulating material, and each guide contains a longitudinal slot into which an edge of the base may be fully inserted and supported for sliding reciprocation. In addition to guiding and supporting the base, the guides provide mounting points for other components of the support.

A cover or emboss supports the mounting bracket near its exterior end. This emboss or cover provides the point of attachment to the enclosure and supports the rest of the protective device at an appropriate angle to immerse the fuse in oil in the enclosure. The cover contains an opening or orifice through which the removable fuse holer is inserted and removed. Complete insertion of the fuse holder into an oil-filled enclosure ensures that the load switch and the fuse will be immersed in the oil. This arrangement also avoids oil drainage when the fuse holder is removed from the enclosure.

A pair of stationary contacts is mounted on the pair of guides, one on each. They provide the electrical path from the movable contacts on the base, when the base is fully inserted into the slots on the guide to bring the movable contacts into engagement with the stationary contacts. A switchboard is transversely mounted across the pair of guides near the interior ends thereof. The switchboard provides an insulated support for the load switch of the protective device and related components. A baffle is transversely mounted across the pair of guides between the switchboard and the inner most fuse receptacle of the removable fuse holder. The baffle is manufactured from an insulating material isolating the fuse and switch. It prevents a possible arc path and deflects away from the load switch area any expulsion products from a blowing fuse.

A guide terminal is mounted on one of the guides, thus providing an electrical connection point for equipment associated with the protective devices and completing the circuit from one of the pair of stationary contacts. In the preferred embodiment disclosed herein, the guide terminal and stationary contacts are integral. A switchboard terminal mounted on the switchboard similarly provides a connection point to associated equipment. Between the stationary contact not associated with the guide terminal and the side of the switch not associated with the switchboard terminal, a connector cable completes the electrical path in the fuse holder assembly.

A switch handle index plate is mounted on the exterior of the cover, the sides indicating switch position, it fixes the switch in the open and close position by interference fits with the switch handle. A latching bail is also mounted on the exterior of the cover in a pivotable manner. When latched, the bail extends across the cap or circular plate compressing the gasket and thwarting any tendency of the removable fuse holder to be thrown from the fuse holder assembly when the fuse blows.

The load switch includes a switch main arm and its associated switch main arm contact mounted on the switchboard. The switch main arm of the switch is of the blade type and is pivotably mounted. In the preferred embodiment, a switch arcing arm of the blade type is pivotably mounted on the switch main arm and spring biased to maintain substantial alignment between them. The switch arcing arm has its associated switch arcing contact mounted on the switchboard. In the preferred embodiment disclosed herein, the switch main contact and switch arcing contact are integrally formed. The load switch main elements are designed to carry the rated continuous current of the fuse holder assembly. The load switch arcing elements are selected to withstand the arcing which develops when the current flow is interrupted. The spring biasing feature is an over-center arrangement which ensures a quick break of the arc independent of operator speed. In the preferred embodiment, the load switch components are oil immersible, so that the load switch may be type classified as oil immersible, quick break.

The load switch actuator includes a switch operating rod and a handle. The load switch actuator further insulates an operator from high voltage points by providing a remote actuating means for the switch, which locks the removable fuse holder in place when the switch is closed. A switch operating rod extends from the pivot point of the main switch arm of the switch to the switch handle on the exterior of the cover. It provides an insulated means to mechanically connect the load switch and the switch handle. In the preferred embodiment disclosed herein, passage for the switch operating rod through the cover is a sealed orifice. The switch handle is privotably mounted on the cover and secured to the operating rod. A locked portion of the switch handle extends over the exterior of the removable fuse holder when any portion of the load switch is conducting. This feature prevents the withdrawal of the removable fuse holder when the fuse holder assembly can conduct electrical current. A looped lever portion of the switch handle provides a point for an operator to insert a hot stick to change switch position. The looped lever is fixed in the load switch open and close positions by the switch handle index plate.

These and other objects, advantages and features of this invention will hereinafter appear, and for purposes of illustration, but not of limitation, an exemplary embodiment of the subject invention is shown in the appended drawing.

DETAILED DESCRIPTION OF THE PREFERRED EMBODIMENT

Figure 1:
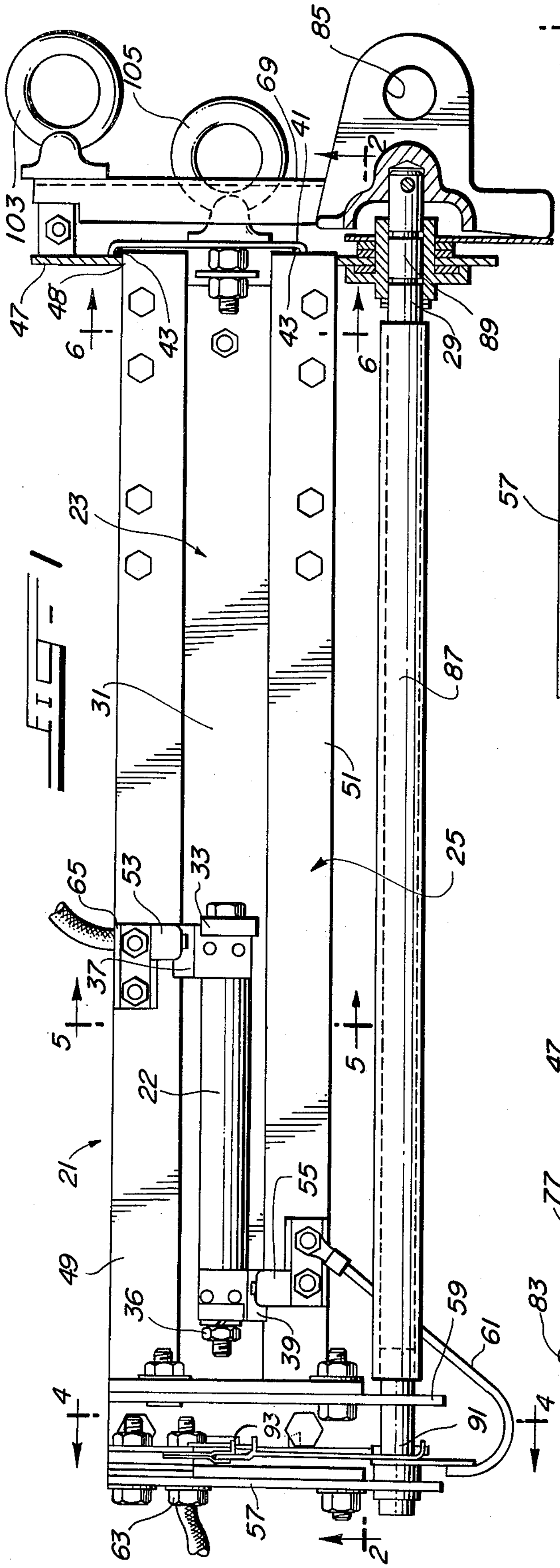
FIG. 1 is top plan view of a protective device constructed in accordance with the present invention.
Figure 4:
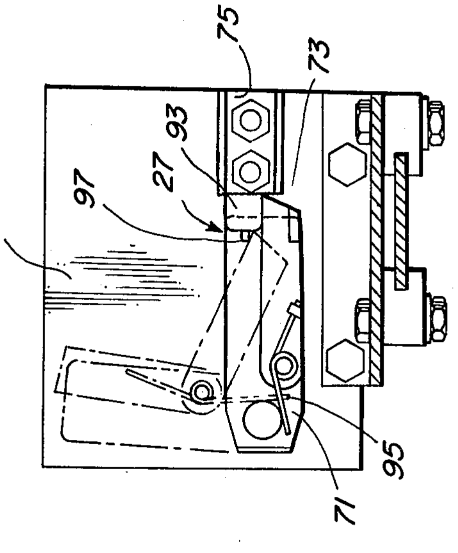
FIG. 4 is a cross-sectional view taken along line 4—4 of FIG. 1.

A protective device 21, constructed in accordance with the present invention, is depicted in FIG. 1. Protective device 21 includes a fuse 22, such as an expulsion fuse, mounted on a removable fuse holder 23. End tabs 33 and 35 are secured to fuse 22. Fuse holder 23 is removably mounted on a support 25, which is affixed to and extends into an enclosure, such as an oil-filled transformer tank. The protective device 21 is so constructed that when support 25 is affixed to an oil-filled enclosure, removal of fuse holder 23 may be made without opening the enclosure and without oil drainage.

Figures 2, 5, 6, 7:
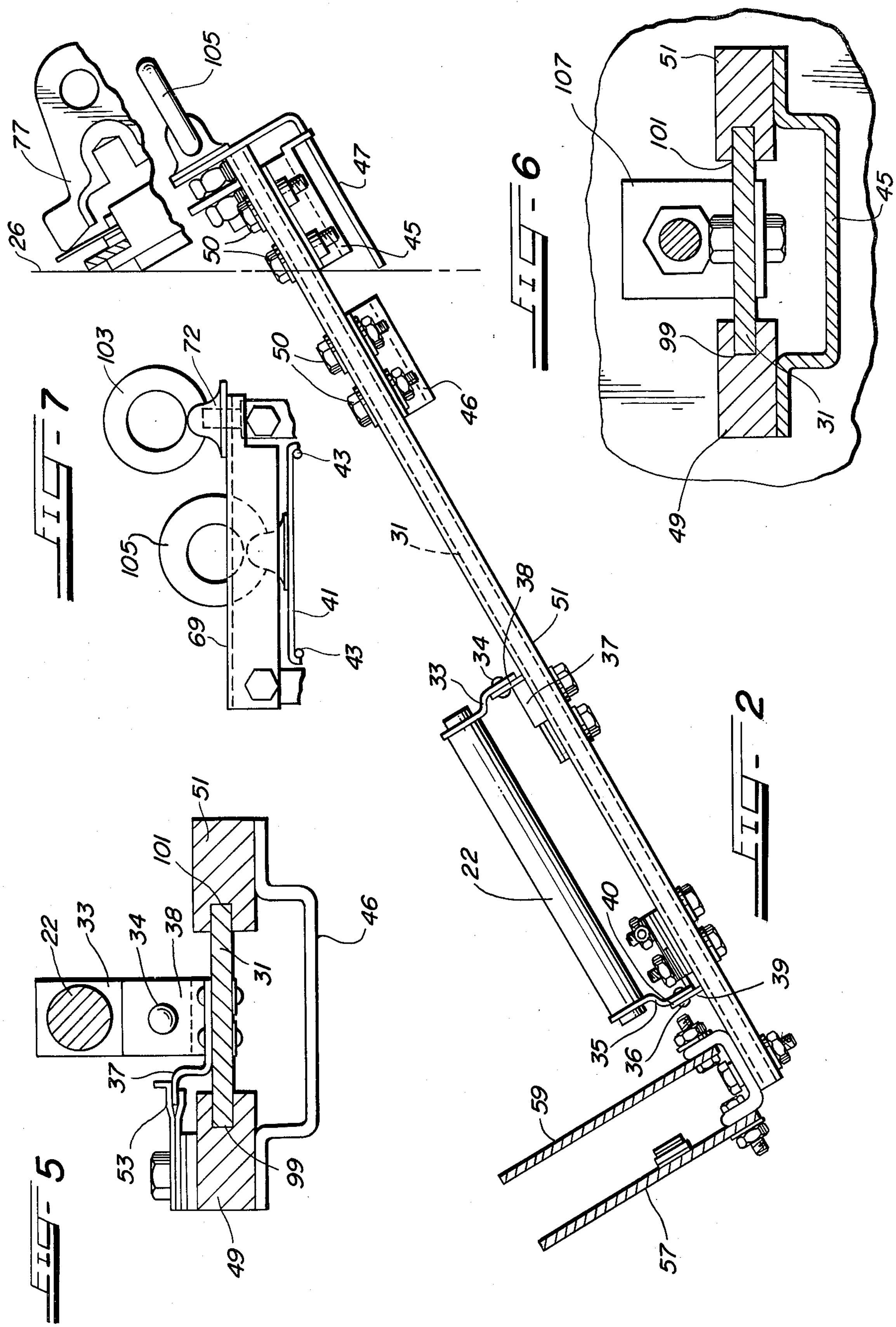
FIG. 2 is a partially broken away cross-sectional view taken along line 2—2 of FIG. 1.
FIG. 5 is a cross-sectional view taken along line 5—5 of FIG. 1.
FIG. 6 is a cross-sectional view taken along line 6—6 of FIG. 1.
FIG. 7 is a partial cross-sectional view taken along line 7—7 of FIG. 3.

FIG. 2 is a partial sectional view of the mounted protective device 21, with the enclosure wall represented by a vertical line 26. Removable fuse holder 23 includes a base 31. Base 31 is a flat, relatively thin section of insulating material having a generally rectangular cross section. Movable contacts 37 and 39, with associated fuse mounting extensions 38 and 40, are secured to base 31. Fuse mounting extensions 38 and 40 are adapted to be fastened to fuse end tabs 33 and 35 by bolts 34 and 36, respectively. Fuse holder 23 also includes a circular plate or cap 41 with an associated compressive gasket 43.

Removable fuse holder 23 is insertable into the angular support 25, which also supports other components of the invention. Support 25 includes mounting brackets 45 and 46, a cover or emboss 47, guides 49 and 51, and stationary contacts 53 and 55. Mounting brackets 45 and 46 are channel-shaped members having the upper ends of its sides turned outwardly. Guides 49 and 51 are secured to brackets 45 and 46 in any suitable manner, such as by bolts 50.

Guides 49 and 51 are manufactured from insulating material and have a slender rectangular shape. Each contains a slot (99 and 101, respectively) on its narrow interior side. Slots 99 and 101 are sufficiently wide and deep to contain and support base 31, as shown in FIGS. 2 and 6. Guide 49 has a stationary contact 53 mounted thereon, while guide 51 has a stationary contact 55 mounted thereon. Stationary contact 55 engages movable contact 39 when a fuse holer 23 is fully inserted. Contact 55 also provides a connection point for a connector cable 61, the other end of which is connected to load switch 27. Stationary contact 53 similarly engages movable contact 37 and provides a connection point for equipment associated with protective device 21. Stationary contact 53 is integrated with a guide terminal 65 for this latter purpose.

Cover or emboss 47 provides the point of attachment to a metal walled enclosure 26. Cover or emboss 47 is a shaped portion of the metal walled enclosure 26 to mount and align the protective device 21. Cover 47, in cross section, has an angular shape. The shape of the emboss or cover 47 is such that the protective device 21 angularly depends from the vertical wall, immersing the interior portion of protective device 21 in oil. This positioning is indicated in FIG. 2. Cover 47 contains an orifice or opening 48 to allow passage of components mounted on the removable fuse holder 23. The periphery of this opening is somewhat less than that of circular plate or cap 41, which in conjunction with a compressive gasket 43, seals it.

Figure 3:
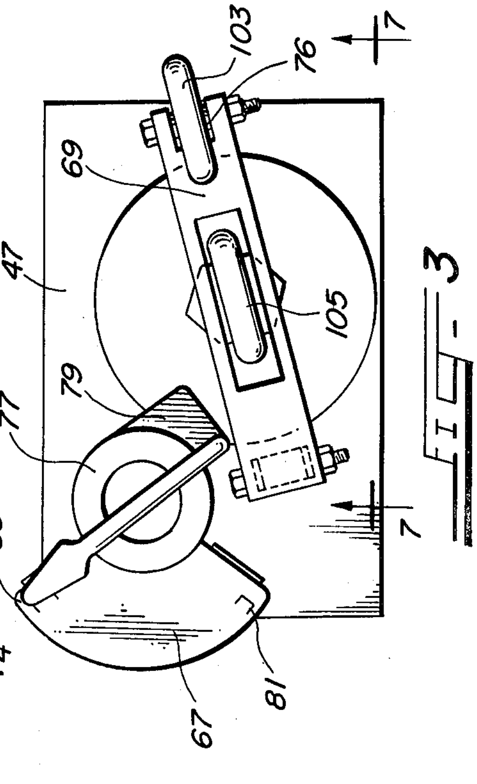
FIG. 3 is a front elevational view of the protective device of FIG. 1.

Gasket 43 is compressed by a latchable bail 69, which forces cap 41 toward cover 47 when an eyenut 103 is tightened. Bail 69 is pivotably mounted on cover 47 (FIG. 3). A generally rectangular slot 70 is formed in bail 69 to permit eyenut 105 to extend therethrough. Eyenut 103 is internally threaded to mate with an externally threaded latch member 72. Latch member 72 is pivotably mounted on cover 47 to selectively fit in notch 76, where eyenut 103 may be tightened. Latchable bail 69 prevents outward movement of cap 41 when latched and swings free when unlatched. In the event that the oil within the enclosure should temporarily rise above its normal ranges, the sealing of the cover orifices prevents spillage.

Affixed near the interior end of support 25 is a load switch 27, which mechanically interrupts or completes the circuit through protective device 21. Switchboard 57 is a sub-component of support 25, mounted transversely across guides 49 and 51 near the ends farthest from cover 45. It is manufactured from insulating material to isolate parts which could be at different voltages and add some rigidity to the interior end of the support. Near switchboard 57, between it and fuse receptacle 35, there is located an insulated baffle 59. Baffle 59 deflects expulsion products from a blowing fuse away from load switch 27 and prevents arcing between load swich 27 and fuse receptable 35. Baffle 59 is also transversely mounted across guides 49 and 51.

Load switch 27 includes a switch main arm 71, a switch arcing arm 73, and an integrated switch main and arcing arm contact 75. When open, load switch 27 ensures that other components of protective device 21, in particular removable fuse holder 23, do not function to mechanically interrupt current flow through protective device 21 or mechanically complete its circuit and allow current flow.

Load switch actuator 29, which opens and closes load switch 27, is also mounted on support 25. Load switch actuator 29 includes a switch handle 77. As shown in FIG. 3, a lock portion 79 of switch handle 77 extends over opening 48, and is hence positioned to engage circular plate or cap 41, when load switch 27 is in a position to conduct electricity (i.e., when load switch 27 is closed). This provides an interlock to prevent insertion or removal of fuse holder 23 unless load switch 27 is open, to preclude arcing at the fuse terminals upon insertion or removal of fuse holder 23.

Detents 81 and 83 on a switch handle index plate 67 fix the looped lever 85 of switch handle 77 in definite positions when load switch 27 is opened and closed. Switch handle 77 is secured to switch operating rod 87 so that they rotate together. Operating rod 87 passes through a sealed orifice 89 in cover 47 and provides a pivot point 91 around which switch main arm 71 rotates. Surrounding operating rod 87 beneath which handle 77 on cover 47 is switch handle index plate 67. As well as fixing switch handle 77 in position, index plate 67 also provides an indication of the condition of load switch 27. Load switch actuator 29 provides an insulated means to couple the rotation of switch handle 77 and load switch 27.

The switch arcing arm 73 of load switch 27 is pivotably mounted on switch main arm 71. As switch main arm 71 rotates, thereby opening the conductive path through it to the switch main contact 75, switch arcing arm 73 initially remains in position to conduct to lip 93 on switch main contact 75. Further rotation of switch main arm 71 draws switch arcing arm 73 past lip 93, where spring 95 forces rotation of switch arcing arm 73 until it is restrained by tap 97 on switch main arm 71. The spring bias of switch arcing arm 73 ensures a fast uniform opening of the conductive path through load switch 27, which is independent of the speed with which the operator operates switch handle 77. This quick-break feature minimizes the adverse effects of the switch opening by quickly quenching any arc drawn between switch arcing arm 73 and lip 93, each of which is resistant to arcing erosion. Switch main arm 71, the integrated switch main and arcing contact 75, and switchboard terminal 63, which provides a connection point to equipment associated with protective device 21, are all mounted on switchboard 57.

Fastened to circular plate 41 of externally removable fuse holder 23 is the eyenut 105. The closed loop structure of eyenut 105 is suitable to provide a point of purchase for a hot stick. Eyenut 105 is secured to angle bracket 107, which in turn is secured to base 31.

Base 31 furnishes an insulated support for the other components comprising the externally removable fuse holder 23. Movable contacts 37 and 39 provide conductive paths between the respective fuse end tabs, 33 and 35, and the stationary contacts, 53 and 55, which are located on guides 49 and 51. A monolithic construction integrating each fuse receptacle and movable contact is illustrated as the preferred embodiment.

In this fashion, a protective device with a quick-break load switch and a removable fuse holder, in which the load switch is interlocked with the fuse holder to preclude removal of the fuse holder unless the load switch is open, has been provided.

It should be understood that various modifications, changes and variations may be made in the arrangement, operation and details of construction of the elements disclosed herein without departing from the spirit and scope of this invention.

I claim:

1. A protective device comprising:

a support affixed to the outer wall of an enclosure and extending therein;

a removable fuse holder movably mounted on said support and bearing a fuse which may be replaced, said fuse holder being removable from the enclosure without generally exposing the interior of said enclosure;

stationary contacts mounted on said support to be engaged by movable contacts on said fuse holder when said fuse holder is fully inserted;

a load switch affixed to said support to break the conductive path to said stationary contacts, thus ensuring that said fuse holder does not function as a switch when said fuse holder is inserted into or removed from the enclosure;

a load switch actuator for opening and closing said load switch, said load switch actuator mounted on said support and extending to a point outside the enclosure; and a handle for said load switch actuator mounted on the end of said load switch actuator outside the enclosure, a lock portion of said handle adapted to engage said fuse holder when said load switch is closed to provide an interlock to prevent insertion or removal of said fuse holder unless said load switch is open.

2. A protective device as claimed in claim 1 wherein said load switch comprises a quick-break switch to control and reduce arcing time when current flow is interrupted or initiated.

3. A protective device as claimed in claim 1 wherein said lock portion of said handle of said load switch actuator extends over an opening in said support through which said fuse holder is inserted and removed, when said load switch is closed, to be in a position to engage said fuse holder and prevent insertion or removal when said load switch is closed.

4. a protective device as claimed is claim 1 and further comprising an index plate with detents which fix said load switch actuator in its open and closed positions.

5. A protective device as claimed in claim 1 and further comprising a latchable bail pivotably mounted on said support to extend over the end of said fuse holder outside the enclosure to forcibly lock said fuse holder in its inserted position.

6. A protective device for an electrical component in an oil-filled enclosure comprising:

an angled support mounted on the enclosure and extending thereinto, said support having an opening formed in one end thereof;

a removable fuse holder insertable and removable through the opening in said support and slidingly mounted on said support, said fuse holder bearing an oil-immersible expulsion fuse thereon;

a circular plate attached to one end of said fuse holder and adapted to cover said opening when said fuse holder is inserted into said support;

a compressible gasket located between said circular plate on said removable fuse holder and said angled support;

a latchable bail extendable over said circular plate to cause compression of said gasket between said circular plate on said removable fuse holder and said angled support when latched;

stationary contacts mounted on said support;

a movable contact at each end of said fuse to engage an associated one of said stationary contacts when said fuse holder is fully inserted;

a load switch of the oil-immersible quick-break type mounted upon said angled support at the end away from said opening, said load switch adapted to make and break the circuit to said stationary contacts;

a rotatable load switch actuator mounted on the exterior of said angled support; and a handle to rotate said load switch actuator, a lock portion of said handle extending over the opening in said angled support to prevent insertion or removal of said fuse holder unless said load switch is closed.

7. A protective device as claimed in claim 6 wherein:

said removable fuse holder comprises a flat base having a substantially rectangular cross section; and a pair of guides having slots formed therein to receive opposing sides of said base are mounted on said support, said fuse holder thus being mounted for reciprocable sliding motion on said support.

8. A protective device for an electrical component in an oil-filled enclosure comprising:

a flat thin base for a removable fuse holder formed from insulating material with a substantially rectangular cross section;

a pair of fuse receptacles for mounting a fuse, said receptacles mounted on said base toward one end to support the fuse and provide conductive paths, a pair of movable contacts, each electrically connected to one of said fuse receptacles, mounted on said base;

a circular plate with a projecting handle mounted transversely to the base at its other end, said plate being insulated from conducting elements;

a mounting bracket generally of a channel shape with the upper portions of its sides bent outward and parallel to its floor, said bracket being affixed to the enclosure with an interior end thereof extending into said enclosure;

a cover mounted on the exterior end of said mounting bracket and having an opening formed therein to accommodate the insertion and removal of the fuse holder with the fuse mounted on said base;

a compressive gasket surrounding the opening in said cover between said circular plate in said cover;

a pair of guides formed from insulating material, each of said guides being mounted upon an outwardly bent portion of the channel sides of said mounting bracket;

a slot formed in each guide on its side facing the interior of the channel, said slots extending at least the length of said base and the width of said slots being slightly greater than the thickness of said base in order to permit sliding motion of said base in said slot;

a pair of stationary contacts, each of said stationary contacts mounted on one of said guides in a position to form a conductive path with said moveable contacts when said base is fully inserted into the slots of said guide;

a switchboard manufactured from insulating material and mounted transversely across said guides at their interior ends;

a baffle formed from insulating material and mounted across said guides between said switchboard and the inner most of said fuse receptacles;

a switch main arm pivotably mounted upon said switchboard;

a switch arcing arm pivotably mounted upon said switch main arm and spring biased to provide substantial alignment of the major axes of said switch main arm and said switch arcing arm;

a switch main arm contact mounted upon said switchboard in such a location as to form a conductive path when said pivotably mounted switch main arm is engaged with said switch main arm contact;

a switch arcing arm contact mounted upon said switchboard to form a conductive path with said switch arcing arm when said switch main arm is conducting and when said switch main arm is in an intermediate position during opening;

a connector cable between the inner most of said fuse receptacles and said switch main arm;

a switchboard terminal electrically connected to said switch main arm contact;

a guide terminal electrically connected to the outer most of said contacts mounted on said guide;

a switch operating rod manufactured from insulating material and extending from said switch main arm through a sealed orifice in said cover;

a switch handle mounted on said switch operating rod, said handle having a looped lever portion and a lock portion, said lock portion extending over the opening in said cover when either said switch main arm or said switch arcing arm is forming a conductive path with an associated contact, in order to prevent removal or insertion of the fuse holder;

a switch handle index plate mounted on said cover with detents which interfere with and fix the looped lever portion of said switch handle in two positions, one position to interrupt the conductive paths through the said switch main arm and said switch arcing arm, and the other position to fix said handle when the conductive paths exist; and a latchable bail pivotably mounted on said cover which, in the closed position, extends over said circular plate provides a compressive force on said gasket between said circular plate and said cover, and which, in the open position, pivots freely to allow outward movement of said circular plate and hence the fuse holder.

* * * * *